United States Patent Office 2,750,359
Patented June 12, 1956

2,750,359

RESINS FROM STEAMCRACKED C₅ DISTILLATE FRACTIONS

Glen P. Hamner and Thomas G. Jones, Baton Rouge, La., assignors to Esso Research and Engineering Company, a corporation of Delaware No Drawing. Application April 13, 1953,
Serial No. 348,588

3 Claims. (Cl. 260—82)

This invention is broadly concerned with the preparation of petroleum resins and, more specifically, with the polymerization of blends from selected steam cracked distillate streams of the C₅ range with methylcyclopentadiene.

In general, heavier petroleum fractions such as naphtha, kerosene, gas oil, and the like, are cracked at relatively low pressures and at temperatures of 1000 to 1500° F. in the presence of steam and for relatively short contact times. The gas and liquid streams produced contain large quantities of diolefins and olefins in the C₅ to C₁₀ range. The naphtha distillate streams obtained by these steam cracking operations contain relatively large amounts of diolefins, olefins, aromatics, and some paraffins.

The process of this invention is concerned with the selection and polymerization of blends prepared from a C₅ fraction of specific boiling range and composition with critical amounts of methylcyclopentadiene monomer.

To obtain the selected and preferred polymerization feed streams to be used in this invention, the C₅ containing distillate streams are initially processed to remove the cyclopentadiene. These cyclopentadienes are removed as dimers.

By an initial thermal soaking of the C₅ fraction boiling from the initial boiling point up to about 120° F. and sufficient heating time, the cyclopentadiene is dimerized and separated by careful vacuum or steam distillation. Preferred dimerizing temperatures are in the range of 100–220° F. The dimers are removed as a bottoms fraction from the distillation tower, the tower being operated to prevent any substantial depolymerization of the cyclopentadienes. In this distillation, the C₅ hydrocarbons boiling below the dimers are removed as an overhead distillate stream. This overhead, consisting of the undimerized portion, contains chiefly straight chain olefins and acyclic diolefins. These materials include isoprene as well as other C₅ olefins.

The initial C₅ fraction preferably is selected with a boiling range of 50° to 120° F. and has the following general composition.

| | Weight Percent |
|---|---|
| Isoprene | 15–20 |
| Cyclopentadiene | 10–12.5 |
| Piperylene | 10–15 |
| Other diolefins | 5 |
| Tertiary olefins | 15–20 |
| Normal olefins | 20–25 |
| Paraffins | 2.5 |

Following the dimerization and separation of the cyclopentadiene dimers, the remaining C₅ overhead fraction has the following composition:

| | Weight Percent |
|---|---|
| Isoprene | 15 |
| Piperylene | 15 |
| Other acyclic diolefins | 4–5 |
| Normal C₅ olefins | 20–30 |
| Tertiary olefins | 30 |
| Paraffins | 5 |

This undimerized portion, contains chiefly olefins and diolefins. This fraction is then mixed with 5 to 15 wt. percent methylcyclopentadiene before the polymerization step using BF₃ as the catalyst. This comprises a method for preparing polymerized resins of good quality. A polymeric oil is the product obtained where polymerizing with BF₃ catalyst, the C₅ fraction (50°–120° F.) without the methylcyclopentadiene present. The presence of more than 15% methylcyclopentadiene in the feed causes gel formation. When methylcyclopentadiene concentration of greater than 40% is used, a high yield of rubbery type product is obtained. The methylcyclopentadiene added is in the form of the monomer and not as the dimerized material.

The polymerization of the blended feed is carried out using BF₃ as the polymerization catalyst at temperatures in the range of 0° to +80° F. The liquid material undergoing reaction must be well agitated to insure adequate saturation of the liquid with the gas.

The polymerization reaction is carried out as a liquid phase operation. The catalyst may be added continually or batchwise. Any practical and effective methods for adding catalyst and reagents can be utilized.

The time required to carry out the polymerization depends primarily on the rate that the catalyst can be added such that the reaction can be adequately controlled. The products are worked up by water or caustic washing or by washing with dilute H₂SO₄ (5%) followed by water washing. The catalyst residues can also be removed by the addition of alcohol (isopropyl) followed by subsequent water washing. The polymerized resin is then stripped free of unreacted feed components and any of the low molecular weight polymerization products to give the final resin. The exact yield and softening point of the final product will depend on the degree of stripping. If the amount of methylcyclopentadiene is restricted to not more than 15 wt. percent in the blend, the resin product obtained will be relatively free of insoluble gel and completely soluble in hydrocarbon type solvents.

The above gel-free resin can be used as a base for paint, varnish manufacture, or formulated in printing ink. The resin has a good color and odor and is completely miscible in a naphtha solvent. Upon addition of cyclic diolefin monomer, the feed blend should be polymerized as soon as possible to obtain the best resin yield since the monomer will be dimerized at long residence time.

*Example*

A typical analysis of the 50–120° F. fraction used in the following blends with methylcyclopentadiene monomer is as follows:

| Component: | Weight Percent |
|---|---|
| Isoprene | 16.4 |
| Pentene-1 | 15.4 |
| Cis and trans-pentene-2 | 7.2 |
| 2-methyl-1 butene | 14.3 |
| 2-methyl-2-butene | 5.5 |
| 3-methyl-1-butene | 13.2 |
| n-Pentane | 5.3 |
| Cis and trans-piperylene | 14.9 |
| Cyclopentene | 6.5 |
| Cyclopentadiene | 0.4 |
| Cyclopentane | 0.5 |
| C₆+ | 0.4 |
| | 100.0 |

The above fraction was then blended with 10, 20 and 40 wt. percent methylcyclopentadiene and the resulting blends subjected to polymerization with BF₃ catalyst at 30–70° F. for 30 minutes. The excess catalyst was removed by alcohol addition followed by water washing, prior to distillation step to recover the resin formed.

| Blend Composition | Blend 1 | Blend 2 | Blend 3 | Blend 4 |
|---|---|---|---|---|
| $C_5$ fraction, wt. percent | 100 | 90 | 80 | 58 |
| Methylcyclopentadiene, Wt. percent | | 10 | 20 | 42 |
| Resin Inspection: | | | | |
| Resin Yield, Wt. percent | 60.1 | 43.6 | 42.6 | 87.8 |
| Softening Pt., °F | 85 | 142 | 208 | |
| Aniline Pt., °F | 240 | | 240 | |
| Color, Gardner dil | 0 | 2–3 | 3–4 | |
| Gel Formation, percent | None | None | 2–4 | 54.3 |

What is claimed is:

1. A process for preparing gel-free petroleum resins which comprises fractionating a steam cracked unsaturated petroleum stream to separate a $C_5$ fraction boiling from 50° to 120° F., subjecting said $C_5$ fraction to thermal treatment whereby the cyclopentadiene is converted to dimers, separating said dimers from the undimerized portion of the $C_5$ fraction, blending said undimerized portion with from 5 to 15 wt. percent of methylcyclopentadiene monomer, subjecting the resulting blend to polymerization at temperatures of from 0° to +80° F. in the presence of $BF_3$, and isolating the gel-free resin produced thereby.

2. A process for preparing soluble petroleum resins which comprises fractionating a steam cracked unsaturated petroleum stream to separate a $C_5$ fraction boiling from 50° to 120° F., subjecting said $C_5$ fraction to thermal treatment at 100–220° F. whereby the cyclopentadiene is converted to dimers, separating said dimer from the unreacted portion of the $C_5$ fraction, admixing said unreacted portion with from 5 to 15 wt. percent of methylcyclopentadiene monomer, and polymerizing the resulting blend at a temperature in the range of from 0° to +80° F. with $BF_3$ catalyst, and separating the hydrocarbon soluble resin product produced thereby.

3. A process for preparing soluble petroleum resins which comprises fractionating a steam cracked olefin-containing petroleum stream to separate a $C_5$ fraction boiling from 50° to 120° F., heating said $C_5$ fraction at 100–220° F. to convert the cyclopentadiene present to dimer, separating the undimerized portion of the $C_5$ stream as an overhead fraction from the dimerized bottoms, stream, admixing said undimerized portion with from 5 to 15 wt. percent of methylcyclopentadiene monomer, polymerizing the resulting mixture with $BF_3$ at 30–70° F. and isolating the hydrocarbon soluble resin product produced thereby.

References Cited in the file of this patent

UNITED STATES PATENTS

| | | |
|---|---|---|
| 1,263,813 | Sperr | Apr. 23, 1918 |
| 2,193,792 | Wilson | Mar. 19, 1940 |
| 2,521,359 | Garber | Sept. 5, 1950 |
| 2,523,150 | Schneider | Sept. 19, 1950 |